Feb. 17, 1959 C. C. SIMMONS Re. 24,602

ELECTROSTATIC METHOD AND APPARATUS FOR SPRAY COATING OF ARTICLES

Original Filed March 5, 1952 4 Sheets-Sheet 1

Inventor
Charles Curtis Simmons
By
Schroeder, Merriam, Hofgren & Brady
Attorneys Inventor
Charles Curtis Simmons
By Schroeder, Merriam, Hofgren & Brady
Attorneys Feb. 17, 1959 C. C. SIMMONS Re. 24,602

ELECTROSTATIC METHOD AND APPARATUS FOR SPRAY COATING OF ARTICLES

Original Filed March 5, 1952 4 Sheets-Sheet 3

Inventor
Charles Curtis Simmons
By Schroeder, Merriam, Hofgren & Brady
Attorneys

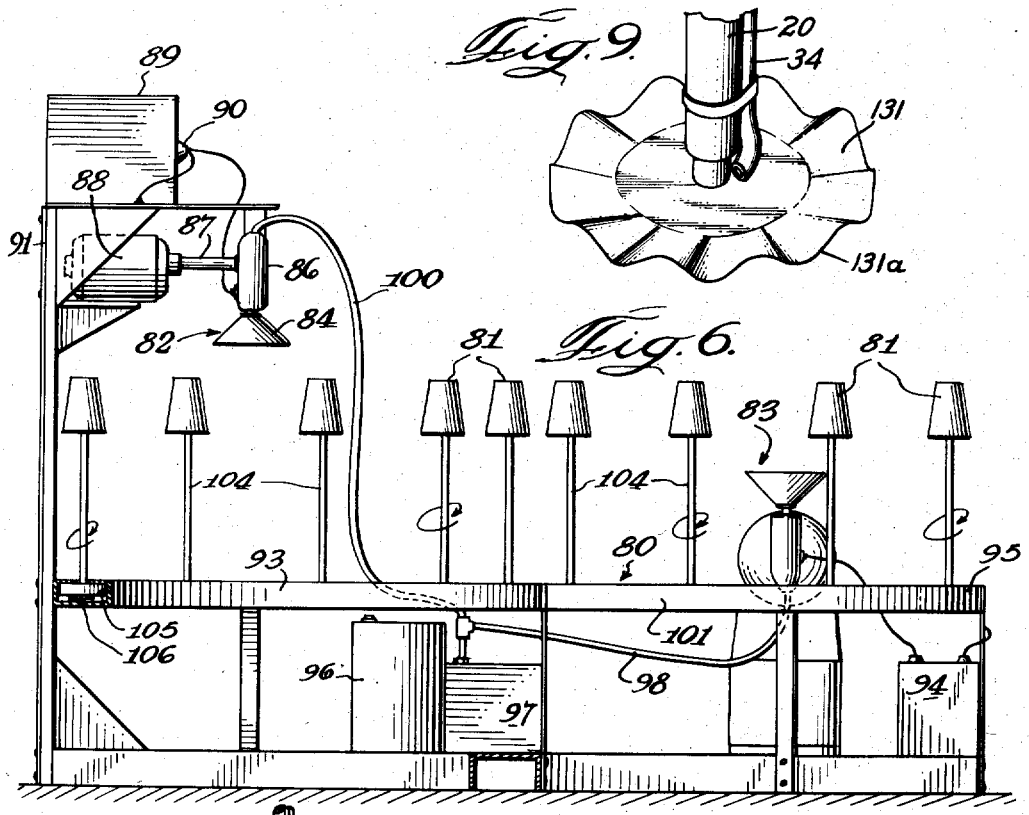
Fig. 6.
Fig. 9.
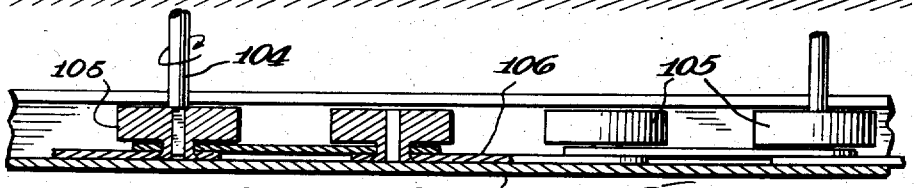
Fig. 7.
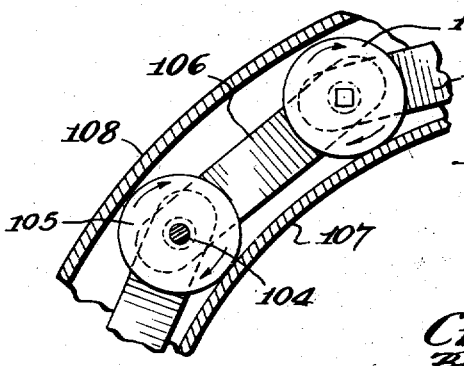
Fig. 8.
Inventor
Charles Curtis Simmons
By
Schroeder, Merriam, Hofgren & Brady
attorneys United States Patent Office Re. 24,602
Reissued Feb. 17, 1959

24,602

ELECTROSTATIC METHOD AND APPARATUS FOR SPRAY COATING OF ARTICLES

Charles Curtis Simmons, Skokie, Ill., assignor to Ransburg-Electro-Coating Corp., a corporation of Indiana Original No. 2,808,343, dated October 1, 1957, Serial No. 274,909, March 5, 1952. Application for reissue September 29, 1958, Serial No. 764,483

21 Claims. (Cl. 117—93)

Matter enclosed in heavy brackets [ ] appears in the original patent but forms no part of this reissue specification; matter printed in italics indicates the additions made by reissue.

This invention relates to the spray coating of articles and more particularly to coating apparatus and coating methods to be used in electrostatic coating systems.

In a majority of electrostatic coating systems a field of electrostatic force is set up which includes the article being coated and the atomized coating material particles in movement toward such article. Deposition of the atomized particles is primarily the result of electrostatic forces and the particles are given an electrostatic charge at the time they leave the atomizing or spraying device or shortly thereafter. Where the articles to be coated are of conducting material, it has been the normal commercial practice to mount the articles on a grounded conveyor and thus to make the articles themselves an electrode at ground potential. Another electrode at high electrical potential is provided with this electrode sometimes being the spraying device and sometimes being a separate electrode near or past which the sprayed particles pass in their movement toward the article.

Where the spraying device is one of the electrodes in an electrostatic field and where atomization of the coating material is accomplished without the aid of compressed air, it has been found that the spray of atomized coating material particles takes a rather definite pattern which depends at least partially on the shape of the atomizing means. Thus, where the highly efficient atomizing head of the type shown in the co-pending application of E. M. Ransburg, Serial No. 143,994, filed February 13, 1950, is used, the natural pattern of the spray is annular in shape, that is, if a rotating bell-type head of the type shown in said Ransburg application is positioned with its axis of rotation vertically arranged and coating material is supplied to the head for coating a flat sheet located beneath the head, the spray pattern on the sheet would be generally in the form of a circle. In the coating of such sheets, of course, relative motion is produced between the head and the sheet so as to apply a homogeneous film of coating material thereover. Where articles having a diameter less than the diameter of the spray pattern are to be coated, a more difficult problem arises. If a group of small articles is to be coated and is passed in linear array beneath a coating head of the bell-type previously mentioned, the articles would be passed through only a portion of the natural pattern of the spray; and while the electrostatic forces present would be sufficient to pull in most of the particles out of the natural pattern and onto the article, some over-spray or loss of coating material may occur.

One of the features of the present invention is the provision of an electrostatic coating system wherein the articles to be coated are carried along through the natural pattern of the atomizing means for an appreciable distance and therefore over-spray is prevented.

A further feature of the invention is the provision of an electrostatic coating system wherein an atomizing device having a natural spray pattern which is annular in shape is employed to supply the atomized coating material particles and wherein the articles to be coated are moved in a path a substantial portion of which is circular and coincides with the natural annular pattern. By so moving the articles relative to the natural pattern of the atomizing device, substantially all of the coating material atomized is deposited or precipitated on the article by the electrostatic forces employed and little material is lost through over-spray even if the articles are small.

Another feature of the present invention is the provision of a modified form of atomizing means which can be simply and inexpensively constructed and yet which is quite efficient in operation. The preferred form of such modified atomizing means is a flat, circular disk of sheet metal or the like which is rotated about its center at a speed sufficient to spread coating material delivered to the surface of the disk at or near its axis of rotation into a thin film outwardly to the edges of the disk for atomization from an atomizing zone adjacent the disk edge. If desired, the disk itself may be maintained at high electrical potential relative to the articles and thus form one of the electrodes in the electrostatic coating field. If such a disk type atomizing head is employed in a coating system wherein the articles are moved past and into field-creating relationship with the head along a path which lies in the plane of rotation of the disk, it will be realized that both of any centrifugal forces acting upon the coating material and the electrostatic forces which serve to deposit the coating material on the articles will operate in parallel, that is in substantially the same direction so that the force of one supplements or augments the force of the other.

A further feature of the invention contemplates the use of a disk-type atomizing head of the type described in the preceding paragraph in an electrostatic coating system wherein the articles to be coated are moved in a semicircular path around the head and in the plane of rotation thereof. The result of such a system is to produce a highly efficient coating apparatus which possesses the additional advantage of permitting slower feeds of coating material to the head without the necessity of the additional use of solvents to prevent hardening or stiffening of the coating material before it is deposited on the articles. This latter advantage is believed to be due to the fact that the rotation of the disk speeds the coating material rapidly to the edge thereof for atomization so that any particular portion of the film of coating material on the surface of the disk remains exposed to the air only for a relatively short period of time, and thus retains the solvents normally present therein.

As a corollary feature of the invention, there is provided a system wherein small articles which are to be coated on their sides, top and bottom are moved into field-creating relationship with two atomizing means, one positioned above the plane of movement of the articles and the other positioned below such plane. The two atomizing means employed may be vertically spaced from one another and both operated as the articles pass in a circular path through the natural pattern of each atomizing means although it is preferred to move the articles in two such semicircular paths, one through the natural pattern of an atomizing means placed above such path and the other through the pattern of a second atomizing means located below such path. By utilizing this type of apparatus and method, an adequate covering of all portions of the article by the coating material can be achieved and the coating material is not concentrated along the areas of the article nearest the atomizing means while producing an insufficient coating on other areas of the article as might otherwise occur if only one atomizing means were employed.

While as previously discussed above, an adequate coating of material can be applied to the top, bottom and sides of small articles by the use of two atomizing means, it has also been discovered that a single atomizing means can be employed to achieve a similar result if the atomizing means is moved or reciprocated relative to the articles during their passage through the coating zone. Thus, the atomizing means may be reciprocated in a direction axial of the annular spray pattern so that deposition is effected over the entire article surface in desired manner even though the extent of the article is such as to exceed the spray pattern width at the coating zone. Therefore, another feature of the invention is the provision of means for reciprocating the atomizing means during the passage of an article through the coating zone so as to apply a uniform coating of the material on all portions of the article.

Another feature of the invention is the provision of control means for a reciprocating type of atomizing means as described in the previous paragraph which serves to control the length of the reciprocating stroke of the atomizing means together with readily adjustable means for varying the length of this stroke and for variably determining the top and bottom limits of the stroke.

Other and further features of the invention will be readily apparent from the following description and drawings, in which:

Fig. 6 is a vertical sectional view along line 6—6 of Fig. 5;

Fig. 7 is a vertical, sectional, detailed view of the conveyor mechanism;

Fig. 8 is a horizontal, sectional view of the apparatus shown in Fig. 7; and

Fig. 9 is an enlarged detailed view of an alternative form or disk-like atomizing means forming a part of the invention.

While several forms of apparatus are illustrated in the accompanying drawings and will be described hereafter as providing means for practicing the present invention, it will be understood that these are representative embodiments only. It will also be understood that forms of spraying devices other than the particular atomizing devices shown may be utilized and that other apparatus may be employed for accomplishing the purposes and for practicing the methods of the invention, and it is to be understood that other embodiments may be utilized without departing from the contemplated scope of the present invention, and that no limitations are to be implied from the specific description now provided.

Figure 1:
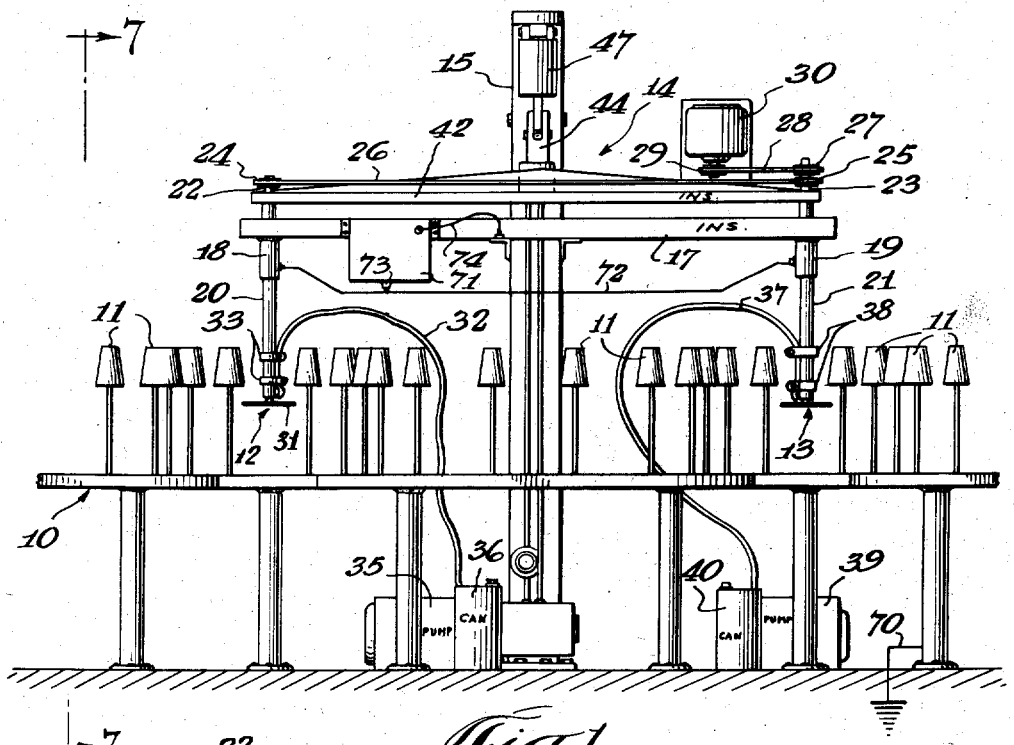
Fig. 1 is a front elevational view of an apparatus embodying the invention.

Referring now to Fig. 1, there is shown a conveyor 10 provided with means for carrying a plurality of articles 11 in a semicircular path around a first atomizing means 12 and thence around a second atomizing means 13. The atomizing means are mounted for vertical reciprocation on a support generally designated 14.

The support 14 includes an upstanding, fixed column 15, preferably of channel iron construction, to which is secured a horizontally extending angle arm 16 to the outer end of which is fixed a horizontally extending bracket 17 made of Bakelite or other insulating material. The bracket 17 is provided adjacent its outer ends with a pair of metallic sleeves 18 and 19, each of which slidably carries a hollow metal support rod 20 and 21. Rotatably mounted within the support rods are a pair of metal drive shafts 22 and 23. Pulleys 24 and 25 are fixed to the upper ends of the drive shafts 22 and 23, respectively, and a V-belt 26 passes around each of the pulleys to connect the shafts 22 and 23 for rotation together. A second pulley 27 is secured to the shaft 23 and carries a V-belt 28 which passes around a pulley 29 fixed to the drive shaft of a driving electric motor 30. From the foregoing description it will be clear that energization of the motor 30 serves through the drive belts and pulleys just described to rotate each of the shafts 22 and 23.

Figure 3:
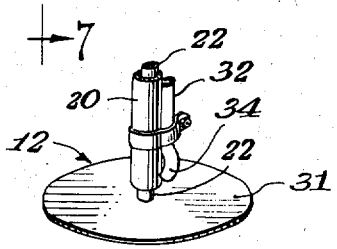
Fig. 3 is an enlarged, detailed view of a disk-like atomizing means forming a part of the invention.
Figure 4:
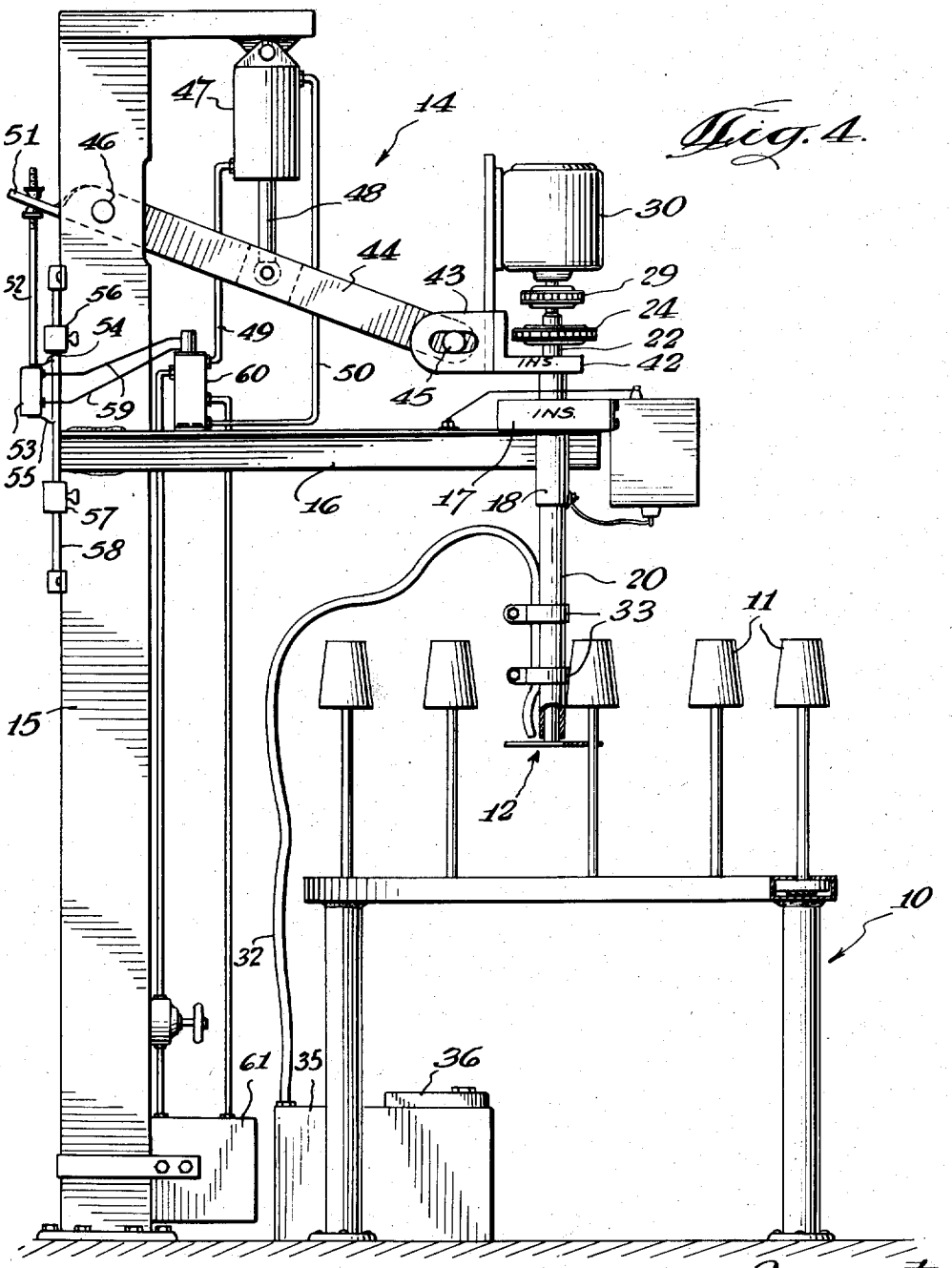
Fig. 4 is a side elevational view of the apparatus shown in Fig. 1.

The lower end of each of the shafts carries the atomizing means which, in the embodiment illustrated in Figs. 1 and 3, takes the form of a thin, flat, circular disk 31 of sheet metal. A flexible tubing 32 of plastic, rubber or other insulating material is secured by means of a pair of brackets 33 to the support rod 20 with the end 34 of the tubing opening to the upper surface of the disk 31 adjacent its center and with the other end being connected to a pump 35 which draws coating material from a container 36 and delivers it to the upper surface of the disk. A similar tubing 37 is attached by brackets 38 to the support column 21 and to a second pump 39 in turn connected to a second source of coating material 40 for delivering coating material to the upper surface of the disk comprising the atomizing means 13. Both of the tubings 32 and 37 may be connected to a single pump if both atomizing means are to coat the articles with the same material; however, as it is possible to achieve some drying between the time the articles are coated as they pass adjacent the atomizing means 12 and until they are moved into depositing relationship with the atomizing means 13, it becomes possible to apply a prime coat with the first atomizing means and a finish coat with the second atomizing means, and obviously if such an operation is contemplated, separate pumps and supplies of coating material will be required for each atomizing means.

The degree of fineness of the particles of coating material atomized may be varied by changing the speed of rotation of the disc. Thus as the speed of rotation is increased, the particle size decreases. Preferably with a disc of from four to eight inches in diameter the speed of rotation thereof is from 1500 to 2000 R. P. M. With finer particle size, each particle has less inertia and thus soon looses the force of centrifuge. Because of this, less voltage is required to effect deposition. In a system with an eight inch disc rotating at 1500 to 2000 R. P. M. at about nineteen inches from the articles, voltages of from 25,000 to 50,000 volts may be used without decreasing the efficiency of deposition and, of course, with increased safety to personnel.

As previously mentioned, means are provided for reciprocating the atomizing means vertically as the articles 11 are moved along the conveyor. For this purpose the upper ends of the hollow support columns 20 and 21 are carried in a cross bar 42 made of insulating material in turn supported by means of a slotted bracket 43 on the outer end of an arm 44. The arm carries at one end a pin 45 slidable in the slot in the bracket with the other end of the arm being pivotally mounted at 46 on the support 15. A pneumatic piston and cylinder device 47 is provided with a piston rod 48 connected at one end to the piston and at the other end to the arm 44. Means in the form of conduits 49 and 50 are provided for supplying air under pressure alternately to opposite ends of the piston and cylinder device to reciprocate the piston therein, and thus to swing the arm 44 about its pivot 46. Such swinging movement of the arm is of course accompanied by vertical movement of the support bar 42 to which the arm is connected and thus reciprocates the atomizing means 12 and 13 vertically during the coating operation.

Inasmuch as the articles 11 may vary from job to job in over-all size and shape, means are provided for regulating both the length of the stroke of the reciprocating means and the points to which the reciprocal motion of the atomizing means are reversed. To this end the arm 44 is extended so as to have an integral portion 51 extending beyond the pivot point 46, which portion carries a rod 52 which in turn carries a microswitch 53 provided with the upper and lower contacts 54 and 55 adapted to contact dogs 56 and 57 adjustably positioned on a rod 58 attached to the support 15. The microswitch is provided with suitable connections 59 to an electrically operated valve 60 which controls the introduction of compressed air into the conduits 49 and 50 from the air pump 61. As the arm 54 is pivoted downwardly the microswitch 53 is moved upwardly until its upper contact 54 makes contact with the dog 56. Such contact serves to reverse the valve 60 so as to pivot the arm in the reverse direction until the microswitch contacts the lower dog 57. By shifting the dogs both the length of the stroke of the atomizing means and the point of reciprocation may readily be adjusted even during the coating operation.

The width of the spray pattern may be increased even without reciprocating the discs by providing the discs with a corrugated or "pie crust" edge. A disk 131 with one form of a corrugated or "pie crust" edge 131*a* is shown in Fig. 9. Thus an eight inch disc may be provided with three quarter inch hammered corrugations along its edge and such corrugations will widen the pattern band to about ten inches at approximately nineteen inches from the axis of rotation of the disc. Similarly, the disc may be mounted on the shaft at an angle of other than 90 degrees relative thereto so as to produce a wobble plate or the axis of the shaft itself may be tilted with respect to the plane of the path of movement of the articles (or the path may be tilted with respect to the axis of the shaft), in either case to widen the effective coverage of the spray pattern.

The conveyor is grounded as indicated at 70 and each of the atomizing means is maintained at a high electrical potential relative to ground by means of a power pack 71 fixed to the bracket 17. Each of the sleeves 18 and 19 is connected to an electrical wire 72 in turn connected to the hot terminal 73 of the power pack, the other terminal of which is grounded on the support 15 as indicated at 74.

Figure 2:
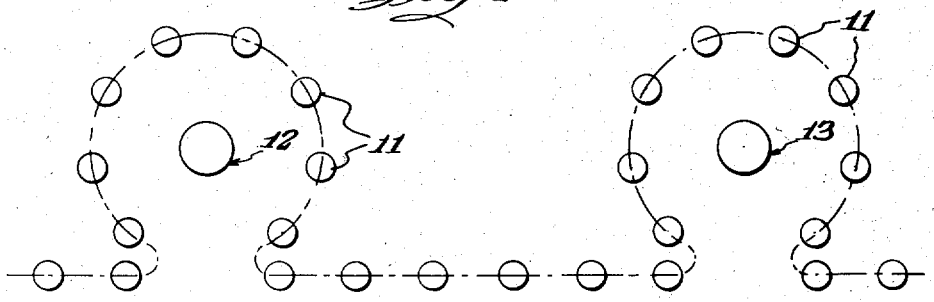
Fig. 2 is a top plan view somewhat schematic in character showing the path of movement of the articles in the apparatus illustrated in Fig. 1.

By referring to Fig. 2, it will be noted that the articles 11 are carried by the conveyor in an arcuate path (exceeding a semicircle) around each of the atomizing means. The path is in the annular patterns of each of the atomizing devices and inasmuch as the articles are spaced radially outwardly from the discs in their plane of rotation, both the electrostatic forces existing between the discs and the grounded articles and any centrifugal force exerted on the coating material as it moves out on the upper surface of the disc and atomizes from the edge thereof operate in parallel to direct the material outwardly toward the articles. During their travel around the atomizing means the articles themselves are rotated so that all sides thereof are presented a number of times toward the atomizing means. Many forms of conveying devices, such as the one hereinafter to be described, may be utilized for producing such movement of the articles.

Figure 5:
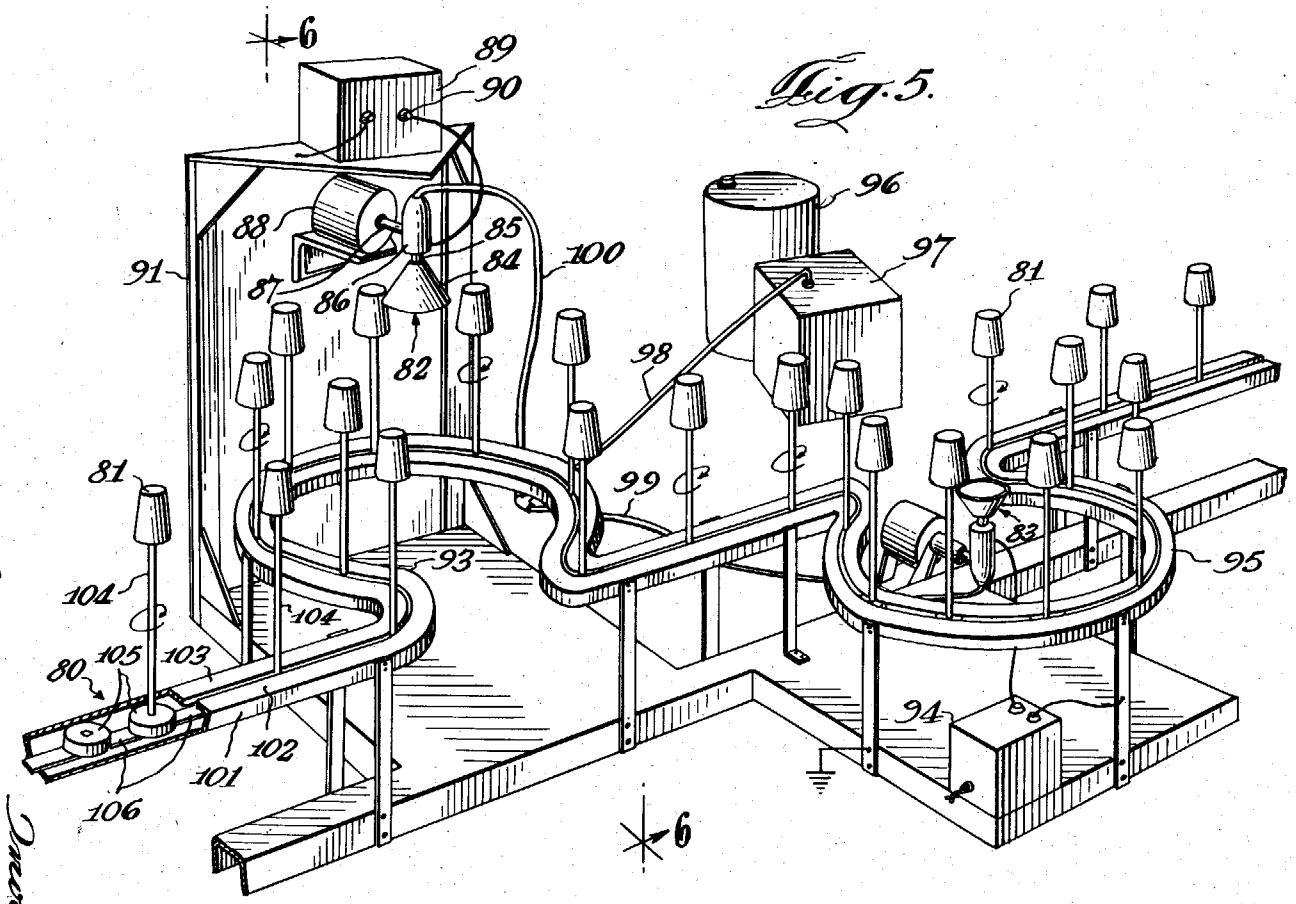
Fig. 5 is a perspective view of a modified form of apparatus.

A somewhat modified form of apparatus is shown in Fig. 5 which includes a conveyor 80 for conveying a plurality of articles 81 around a first atomizing means 82 and thence around a second atomizing means 83. The atomizing means are of the type shown and described in the said application of E. M. Ransburg, and include a bell-type head 84 fixed to a hollow shaft 85 rotatably supported in a housing 86. Beveled gears within the housing are rotated by means of a drive shaft 87 made of insulating material and connected to a driving motor 88. A power pack 89 has its hot terminal 90 connected to the housing with the opposite terminal being grounded to a metallic support 91 which supports both the motor and the power pack.

It will be noted that the atomizing means 82 is fixed relative to the path of movement of the articles, that is, does not reciprocate as did the atomizing means in the previous embodiment, but is positioned above the articles and the path of movement in the arcuate portion 93 of the conveyor is such as to carry the articles 81 in a path which is a portion of a circle lying within the natural annular pattern of the atomizing means. Thus, the articles are carried in a path which is parallel to the center line of the pattern, which in this case is again annular, and the atomizing means is so positioned that the width of the pattern does not exceed a few times the maximum dimension of the article surface transverse to its direction of movement. Thus, in the specific embodiment illustrated, the atomizing means 82 is so positioned that the width of its natural pattern approximates, but in any event is not many times greater than, the vertical length of the articles 81.

The second atomizing means 83 is constructed similarly to the means 82 but is positioned below the articles and connected to a power pack 94 to maintain the atomizing means at a high electrical potential relative to the grounded articles. That portion of the conveyor 95 adjacent the second atomizing means is again arcuate so that the articles 81 in traveling around the second atomizing means again are moved in a portion of a circular path conforming or coinciding with the natural pattern of the second atomizing means. By so positioning the atomizing means and so carrying the articles therearound, both the top, bottom and sides of the article are provided with an adequate covering of the coating material. Thus, the atomizing means 82 serves to deposit coating material on the top and sides of the article while the second atomizing means 83 coats the bottom and sides of the article. As both atomizing means are employed to apply a single coating to the articles, a common source of coating material supply 96 may be used together with a pump 97 for supplying coating material to a feed pipe 98 in turn connected to insulated tubing 99 and 100 connected to the interior of the hollow shafts 85 of the atomizing devices.

While as previously noted, many forms of conveyor devices may be used, the particular one illustrated comprises a channel member 101 formed with spaced integral flanges 102 and 103 along its upper side. Metallic rods 104 carry the articles 81 at their upper end and extend downwardly through the space between the flanges and are secured in rollers 105. The rollers are rotatably mounted upon links 106 which are pivotally connected together at the location of the rollers as shown in Fig. 8. At the curved portion of the conveyor track around each of the atomizing means the rollers 105 contact the sides 107 or 108 of the track to rotate the rollers and hence the support rods and articles during the time the actual coating deposition is taking place. As no coating occurs during the time that the articles are traveling along the straight portion of the conveyor track it is immaterial whether or not the rollers are brought into contact with the sides of the channel to rotate the articles.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus for coating a plurality of articles from exteriorly thereof, comprising: a spraying device for providing an expanding spray of coating material radiating from said device as a center; conveyor means including a plurality of spaced article-supports for bodily transporting said articles and positioning them in spaced relation within at least a portion of the spray pattern and along a predetermined arcuate path concave toward the axis of said spraying device, said conveyor means being so constructed and arranged that a plurality of [article-supports] *supported articles* simultaneously lie within said arcuate path and in said spray pattern; and means for creating an electrostatic charge differential between the spray particles and the articles electrostatically to deposit the particles on the articles.

2. Apparatus of the character described in claim 1, in which said spraying device comprises a rotatably mounted disc provided with an edge having portions in different axial spaced planes whereby rotation of the disc provides a relatively wide spray pattern.

3. Apparatus for coating a plurality of articles from exteriorly thereof, comprising: a spraying device for providing a spray of coating material expanding radially from a source; a conveyor for bodily transporting said articles successively within the spray along a curved path concave toward said spraying device and through a substantial portion of the spray and for individually rotating them during such movement; means for creating an electrostatic charge differential between the spray particles and the articles electrostatically to deposit the particles on the articles; and motor means for automatically reciprocating the spraying device normal to the general direction of spray movement during the coating, said movement having an extent sufficient to coat all portions of articles having a maximum dimension greater than the width of said spray pattern.

4. Apparatus of the character claimed in claim 3, wherein the spraying means moves the full extent of its travel during movement of a given article within the spray, and wherein the article is rotated more than once during such movement.

5. A method for providing a relatively wide coverage of a spray pattern in an electrostatic coating system, comprising: projecting spray particles radially from a source in a pattern expanding generally in a single plane; carrying articles to be coated in a curved path at least partially around the source and through said spray pattern; creating an electrostatic charge differential between the spray particles and the articles in said path electrostatically to deposit the particles on the articles; and maintaining said path at is passes through said spray pattern at an acute angle to the plane of said radially expanding pattern.

6. A method for electrostatically coating a plurality of articles, comprising: providing from a source exterior of the article a spray of coating material in a pattern extending radially from said source; bodily transporting said articles successively through said spray pattern in an arcuate path generally concentric with said source and through at least a substantial portion of the spray pattern; and creating an electrostatic charge differential between the spray particles and the articles electrostatically to deposite the particles on the articles while still in liquid state.

7. A method for coating a plurality of articles, comprising: providing from a source exterior of the article a spray of coating material in a pattern entirely around said source; bodily transporting said articles successively through said spray pattern in an arcuate path generally concentric with the source and through at least a substantial portion of the spray pattern while moving said spray pattern axially; and creating an electrostatic charge differential between the spray particles and the articles electrostatically to deposit the particles on the articles while still in liquid state.

8. Apparatus for electrostatically coating a plurality of articles comprising a rotatably mounted disk, means for supplying liquid coating material to the disk inwardly of the edge thereof, means for rotating the disk to move the material radially to an atomizing zone adjacent the edge of the disk for atomization and centrifugal projection from said atomizing zone in the form of finely divided particles, means for bodily transporting articles in path portions on opposite sides of the disk and in the plane thereof, and means for creating an electrostatic charge differential between the atomized particles and the article.

9. Apparatus for electrostatically coating a plurality of articles comprising a rotatably mounted atomizing member, means for supplying coating material to a surface of said member, means for rotating the member to move the coating material radially over said surface to an atomizing zone adjacent the edge of the surface for atomization and centrifugal projection from said atomizing zone in the form of finely divided particles, conveyor means for bodily transporting said articles and arranged to position articles substantially entirely around said atomizing member with at least some of said articles being in the plane of the edge, and means for creating an electrostatic charge differential between the atomized particles and the articles.

10. Apparatus for coating a plurality of articles from exteriorly thereof, comprising: a rotatable spraying device for providing a spray of coating material moving outwardly in an expanding pattern; conveyor means including a plurality of spaced article-supports for bodily transporting said articles successively in spaced relation within at least a portion of the spray pattern and along a predetermined arcuate path concave toward the axis of said spraying device, said conveyor means being so constructed and arranged that a plurality of [article supports] *supported articles* simultaneously lie within said arcuate path and in said spray pattern; and means for creating an electrostatic charge differential between the spray particles and the articles electrostatically to deposit the particles on the articles.

11. Apparatus for coating a plurality of articles from exteriorly thereof, comprising: a rotatable atomizing device for providing a spray of coating material radiating therefrom in an expanding pattern; a conveyor for bodily transporting said articles successively within the spray along a path having portions on opposite sides of and substantially equidistantly spaced from and in the plane of rotation of the atomizing portion of said device, and through at least a substantial portion of said spray and for individually rotating them during such movement; and means for creating an electrostatic charge differential between the spray particles and the articles electrostatically to deposit the particles on the articles.

12. Apparatus for coating a plurality of articles from exteriorly thereof, comprising: a spraying device for providing a radially expanding spray of coating material; a conveyor for bodily transporting said articles successively within the spray along a curved path concave toward said spraying device and through a substantial portion of said spray; means for creating an electrostatic charge differential between the spray particles and the articles electrostatically to deposit the particles on the articles; and means for moving the spraying device normal to the general radial direction of spray movement during the coating.

13. Apparatus for coating a plurality of articles from exteriorly thereof, comprising: a rotatably mounted atomizing device having a circular edge; means for supplying liquid coating material to a surface of the device; means for rotating the device to move the coating material fed thereto to the edge for atomization therefrom as a spray expanding radially from the axis of rotation of the device; a conveyor for bodily transporting said articles successively within the spray along a curved path concave toward said atomizing device and through at least a substantial portion of the spray; means for creating an electrostatic charge differential between the spray particles and the articles electrostatically to deposit the particles on the articles; and means for reciprocating the atomizing device parallel to its axis of rotation during the coating.

14. Apparatus of the character described in claim 13, including a motor for continuously reciprocating said device during the coating and a control for said motor including a pair of electrical switch means; switch operating means, one of said means being movable in accordance with axial movement of the device; and means for readily adjusting the relative positions of said switch means and switch operating means to adjust the exten' of reciprocation of said device.

15. A method for providing a relatively wide coverage of an annular spray pattern in an electrostatic coating system, comprising: projecting spray particles radially in an expanding disc-like pattern; carrying articles to be coated in a path having portions on generally opposite sides of the axis of the pattern and in the plane of the spray particle projection; said path portions being of greater length than the transverse extent of the spray pattern; and creating an electrostatic charge differential between the spray particles and the articles electrostatically to deposit the particles on the articles.

16. A method for electrostatically coating a plurality of articles from exteriorly thereof comprising carrying the articles to be coated in a curved path, projecting an expanding spray of liquid coating material particles from a source located substantially at the center of curvature of said path, said projection being generally toward the articles on said curved path and creating an electrostatic charge differential between the spray particles at said source and the articles electrostatically to deposit particles thereon.

17. A method for electrostatically coating articles from exteriorly thereof comprising moving a plurality of articles to be coated to positions in a curved path, providing a source of liquid spray particles adjacent the center of curvature of the path, moving said source about said center while issuing spray particles therefrom to create an expanding spray of coating material particles projected generally toward the articles in said curved path, and creating an electrostatic charge differential between said source and the articles electrostatically to deposit particles thereon.

18. A metod for electrostatically spray coating articles from exteriorly thereof comprising projecting an expanding spray of liquid coating material particles from a source, bodily and sequentially transporting the articles in a looped path to simultaneously position a plurality of such articles around and substantially equidistant from said source, said spray projection being generally toward the articles, and creating an electrostatic charge differential between the spray particles and the articles electrostatically to deposit particles thereon while still in liquid state.

19. In a method of electrostatically spray-coating articles from exteriorly thereof with an expanding annular spray of electrically charged particles moving outwardly away from a central axis through the region therearound, the steps of maintaining the articles at a particle-attracting potential and moving them sequentially through the spray over a path spaced outwardly from said central axis and extending circumferentially relative to said axis, said path having within the spray a total linear extent greater than the diameter of the spray at the location of said path.

20. A method for electrostatically spray coating a plurality of articles from exteriorly thereof comprising, providing an electrode, bodily and sequentially transporting articles in a looped path to simultaneously position a plurality of such articles around and substantially equidistant from said electrode, creating an electrostatic field extending between said electrode and said articles, and introducing atomized liquid coating material particles into said field for movement from adjacent said electrode to the articles to be electrostatically deposited thereon while maintaining the articles around said electrode, simultaneously to apply coating material to said articles.

21. Apparatus for coating a plurality of articles from exteriorly thereof, comprising a spraying device for providing an expanding spray of coating material radiating from said device as a center; conveyor means including a plurality of spaced article-supports for bodily transporting said articles and positioning them in spaced relation within at least a portion of the spray pattern and along a predetermined arcuate path concave toward the axis of said spraying device, said conveyor means being so constructed and arranged that a plurality of [article-supports] *supported articles* simultaneously lie within said arcuate path and in said spray pattern; and means for maintaining a substantial difference of electrical potential between the articles on said conveyor and said spraying device to cause electrical charging of the spray particles and deposition of the charged particles on the articles.

References Cited in the file of this patent or the original patent

UNITED STATES PATENTS

| | | |
|---|---|---|
| 1,022,956 | Lengerke | Apr. 9, 1912 |
| 1,577,531 | Lambert | Mar. 23, 1926 |
| 1,832,096 | Chaffee | Nov. 17, 1931 |
| 2,049,940 | Barthel | Aug. 4, 1936 |
| 2,185,570 | Ridley | Jan. 2, 1940 |
| 2,187,306 | Formhals | Jan. 6, 1940 |
| 2,231,324 | Crompton | Feb. 11, 1941 |
| 2,334,648 | Ransburg | Nov. 16, 1943 |
| 2,438,561 | Kearsley | Mar. 30, 1948 |
| 2,456,853 | Arbron | Dec. 21, 1948 |
| 2,559,225 | Ransburg | July 3, 1951 |
| 2,568,611 | Crouse | Sept. 18, 1951 |
| 2,598,466 | Tuttle | May 27, 1952 |
| 2,685,536 | Starkey | Aug. 3, 1954 |

OTHER REFERENCES

No. 2 Electrostatic Process, Ransburg Electro Coating Corp., 1951, 12 pp.